United States Patent Office 2,725,634
Patented Dec. 6, 1955

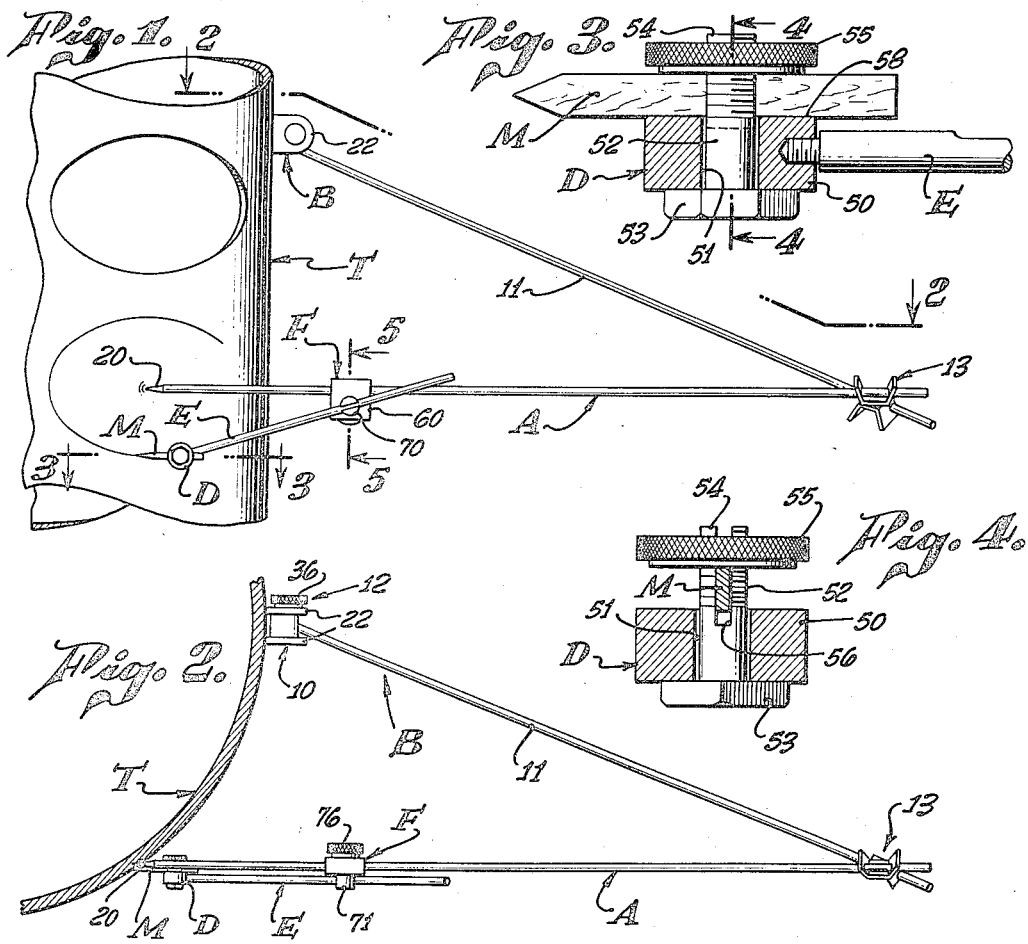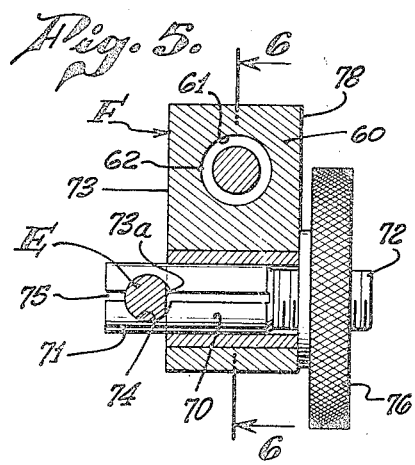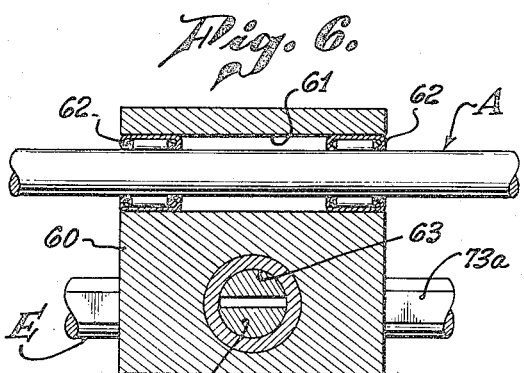

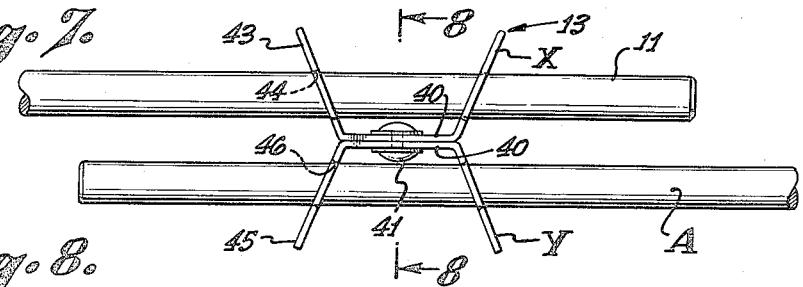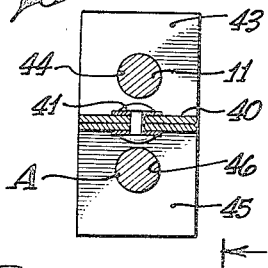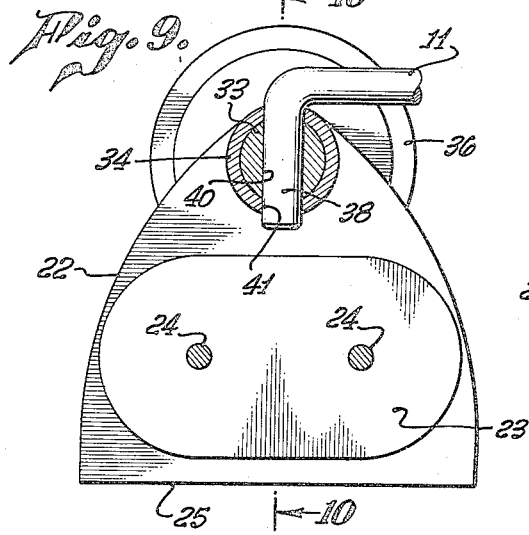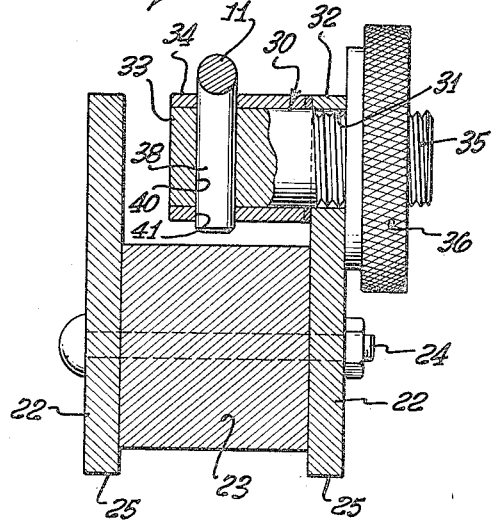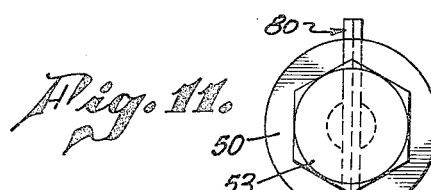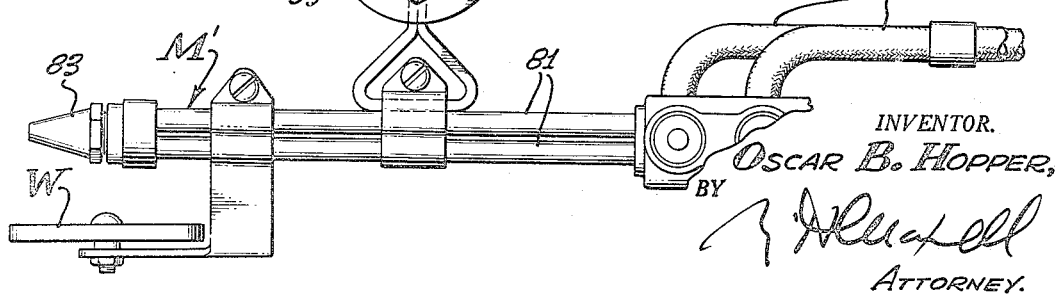

2,725,634

GUIDE FOR CUTTERS OR MARKERS

Oscar B. Hopper, Long Beach, Calif.

Application March 2, 1953, Serial No. 339,840

2 Claims. (Cl. 33—21)

This invention has to do with a guide mechanism for cutters or markers, and it is a general object of the invention to provide a simple, practical, improved construction that can be readily used to advantage in situations where cutting or marking operations are ordinarily difficult to perform.

There are numerous situations or occasions requiring cutting or marking, where ordinary instruments or equipment are not adequate. For example, there are times when a cut or mark, required to be concentric with a fixed or predetermined axis, is to be projected onto a surface or object which is other than flat, or which is in a plane inclined or pitched relative to said axis. A typical situation of this kind is where a pipe is to be joined with or entered into a tank, as at the cylindrical body thereof. Another typical instance is where a cut or mark is to be made at the end portion of a pipe in the course of preparing it to fit the cylindrical body of a tank, or the like, so that these parts are in a predetermined angular relationship.

It is a general object of this invention to provide a device applicable to a suitable fixed support, and serving to carry a work-engaging element, such as a marker or cutter, so that such element is maintained in engagement with the work as it progresses about a fixed axis, and thus follows a circular course regardless of variation of the object from a plane normal to the said fixed axis.

Another object of this invention is to provide apparatus of the general character referred to which involves but few, simple parts, which parts are such that they can be readily set in the desired operating relation and can be easily and conveniently operated in the course of performing the desired marking or cutting.

It is another object of this invention to provide apparatus of the general character referred to including improved simplified features of construction which make for simple, accurate operation, and practical, inexpensive manufacture.

In carrying out the present invention, as where a cut or mark is to be made in the cylindrical body of a tank, or the like, to receive or register with the end portion of a pipe, or like, member, a central stem is provided and is adapted to be established relative to the tank so its axis is coincidental with the axis on which the pipe is to occur. A mounting means is provided to carry the stem in the desired predetermined position and includes a base applicable to a fixed object or support, a standard, preferably elongate in form, a standard coupling connecting the standard to the base, and a stem coupling carried by the standard and carrying the stem. The element to engage the tank is carried by a head which in turn is carried by an arm and the arm is mounted on the stem by means of a carrier. The carrier is such as to rotate about the stem and is free to move lengthwise thereof, to the end that, as the carrier is turned so that the head follows a circular path, it can be moved lengthwise of the stem so that the head shifts parallel with the stem to maintain the work-engaging element in the desired contact with the tank.

The various objects and features of my invention will be fully understood from the following detailed description of typical preferred forms and applications of my invention, throughout which description reference is made to the accompanying drawings, in which:

Fig. 1 is a view illustrating a typical embodiment of the present invention and showing it handling a marker and showing it applied to a cylindrical object such as a tank in a manner to be operable to mark the exterior thereof; Fig. 2 is a plan section of the structure shown in Fig. 1, being a view taken substantially as indicated by line 2—2 on Fig. 2; Fig. 3 is an enlarged detailed sectional view of a portion of the structure, being a view taken as indicated by line 3—3 on Fig. 1; Fig. 4 is a detailed sectional view taken as indicated by line 4—4 on Fig. 3; Fig. 5 is an enlarged detailed sectional view of a portion of the structure shown in Fig. 1, being a view taken as indicated by line 5—5 on Fig. 1; Fig. 6 is a sectional view of the structure shown in Fig. 5, being a view taken as indicated by line 6—6 on Fig. 5; Fig. 7 is an enlarged view of a portion of the structure, being a view illustrating the coupling provided between the standard and the stem; Fig. 8 is a detailed sectional view taken as indicated by line 8—8 on Fig. 7; Fig. 9 is an enlarged sectional view illustrating the construction occurring at the base and showing the standard coupling connecting the standard and the base; Fig. 10 is a sectional view taken as indicated by line 10—10 on Fig. 9; and Fig. 11 is a view showing the head provided on the stem-supported arm carrying a cutter as an element engageable with the object to be worked upon.

As has been suggested above, the present invention can be used to operate or handle elements such as cutters or markers, and in Figs. 1 to 10 inclusive, it is shown handling a marker, whereas in Fig. 11 there is illustrated a cutter in the form of a cutting torch. Further, it is to be recognized that the present invention can, in practice, be employed to carry out various ordinarily difficult marking or cutting operations. For purpose of example, I have elected to illustrate the apparatus of the present invention in form suitable for, and as applied to, a cylindrical object such as a tank, and it is illustrated in the drawings as being set relative to the tank to mark the exterior of the tank to receive or accommodate a pipe, or the like.

In the invention as illustrated in Figs. 1 to 10 inclusive, the object to be acted upon is illustrated as being a cylindrical object or tank T, and the apparatus as provided by the present invention is shown as including a central stem A, mounting means B for the stem including generally a base 10, a standard 11, a standard coupling 12 connecting the standard and the base, and a stem coupling 13 connecting the stem A and the standard 11. The work-engaging element shown as a marker M is carried by a head D provided on an arm E, and a carrier F carries the arm E and is in turn supported by the stem A.

The stem A is a straight, elongate, rigid member, preferably round in cross section and as shown in the drawings, it is a part of substantial length, and is preferably provided with a pointed end 20 adapted to be engaged with the tank T. When the stem A is properly set or mounted, it not only engages the tank T as shown in Figs. 1 and 2, but it projects therefrom or relative thereto, so that its axis is in a predetermined relation to the portion of the tank to be marked.

The mounting means B in the form of the invention under consideration includes a base 10 operable to engage a support, and in the drawings the base 10 is illustrated applied to the tank T so that the tank which is worked upon is utilized as the support. It is to be understood, of course, that in carrying out the invention, the base 10 may be applied to any other support so long as that support is in fixed relation to the tank. The base 10 in the form illustrated is a magnetic unit including spaced pole pieces or shoes 22, and a permanent magnet 23 between the shoes. In the case illustrated, the shoes 22 are simple, flat, plate-like parts, and the permanent magnet is arranged between these plate-like parts. Suitable fasteners or bolts 24 are shown serving to hold the shoes and magnet in the desired assembled relation as clearly shown in Figs. 9 and 10 of the drawings. In carrying out the invention, the shoes 22 of the base are preferably provided with support-engaging faces 25 applicable to a suitable support as for instance through the exterior of tank T. With the base provided with a permanent magnet 23 and assuming the support to be of magnetic material, say, for instance, iron or steel, the base, when placed on the support, will remain stationary thereon until deliberately dislodged.

The standard 11 of mounting means B is preferably a simple, straight, rigid member, for instance, it may be a rod, as shown in the drawings, and like the stem A it is preferably of substantial length. The standard coupling 12, best illustrated in Figs. 9 and 10 of the drawings, includes a coupling pin 30 engaged through an opening 31 provided in a projecting flange portion 32 of one of the shoes 22. The coupling pin has an inner end portion 33 which is a plain, round, or turned part, slidably carrying a sleeve 34. The pin 30 has an outer end portion 35 which is threaded and which carries a nut 36. With the pin arranged through the opening 31 as clearly illustrated in Fig. 10, the turned inner end portion 33 of the pin occurs between shoes 22, whereas the threaded end portion 35 projects from the outer side of the shoes having the opening 31 therein. A finger 38 is provided on and projects laterally from the base end of standard 11, and extends through registering openings 40 and 41 provided in the pin 30 and sleeve 34, respectively. The opening 40 extends transversely through the turned inner end portion 33 of pin 30 so that the finger 38 is held about midway between the shoes 22. With the sleeve 34 between the shoes or at the inner side of the shoe having the opening 31, and, with the nut 36 at the outer side of that shoe, tightening of the nut on the threaded end portion 35 of pin 30 causes clamping of the finger 38, since the finger is supported by the sleeve while the end portion 33 of the pin presses or tends to move toward the shoe having the opening 31. The sleeve 34 is supported at or by the inner side of the shoe provided with the opening 31.

With the construction just described, the nut 36 can be loosened when desired, allowing the finger 38 to turn or allowing the pin 30 and the sleeve 34 to turn, or both, as circumstances may require. When the standard is brought into the desired position through movements occurring at the coupling 12, the nut 36 can be tightened, setting the coupling so that the standard is fixed in the set position.

The stem coupling means 13 serves to connect the stem A with the standard 11 of mounting means B. The coupling 13 is illustrated in Figs. 1, 2, 7 and 8 of the drawings. In accordance with the present invention, the coupling 13 includes, generally, two like oppositely disposed U-shaped holders X and Y, arranged with their base portions 40 engaged, and having a pivot pin 41, pivotally connecting the bases 40 of the holders. The holders X and Y are alike, the holder X being provided to accommodate the standard 11, while the holder Y accommodates the stem A. In the construction illustrated, the holder X has arms 43 that project from the base 40 of holder X. The arms 43 diverge relative to each other, and have openings 44 passing the standard 11. In practice, it is preferred to form the holder X of resilient material such as spring steel, or the like, and the parts are proportioned so that when the standard 11 is engaged with the holder as shown in Fig. 7, the arms 43 tend to spread, as indicated by the arrows, and thus grip the standard. When it is desired to slide or shift the standard 11 relative to holder X, the arms 43 can be moved toward each enough to release the gripping action.

The holder Y corresponds in form and construction with the holder X, and has arms 45 with openings 46 passing the stem A. The arms 45 normally bear apart so that the stem A is gripped, and when it is desired to move the stem relative to the holder, the arms 45 are moved toward each other, enough to release the gripping action. The pivot pin 41 connects the bases 40 of the holders on an axis normal to and intersecting the axes of the standard and stem, as clearly illustrated in the drawings.

With the construction just described, it will be apparent that the coupling 13 can be established in any desired position along the standard 11, and in like manner, the stem A can be shifted to any desired position relative to the coupling. Considering the construction of the couplings 12 and 13, and the nature of the base 10, it will be apparent that the mounting means B is effective to establish the stem A in various positions relative to the tank T, and it will be apparent that the mounting means B is effective to hold the stem accurately and firmly in the desired set position, as, for instance, in a position such as is shown in Figs. 1 and 2 of the drawings.

The element M shown as a marker adapted to engage the exterior of the tank T is carried by the head D, the details of which are illustrated in Figs. 3 and 4 of the drawings. The particular head D illustrated in Figs. 3 and 4 is designed to carry a marker M that is elongate in form, or a mounting bracket which is elongate in form and which is suitable for carrying a cutting torch, or the like.

The head D, in the form illustrated, includes a block 50 fixed on the end of arm E. The block 50 has an opening 51 carrying a screw 52, the head 53 of which engages one side of the block. The screw has a slotted end portion 54 projecting from the other side of the block and carrying a clamp nut 55. The marker M is engaged in the slot 56 of the screw, and bears against said other side 58 of the block. When the screw is tightened, it clamps the marker tight against the side 58 of the block. Through this construction, when the nut 55 is released, the marker can be turned to various positions about the axis of the screw 52 and it can be slid lengthwise of itself to project various distances from the block.

The arm E is preferably a simple, straight, rigid member of suitable length and it projects from the head D to the carrier F which in turn is mounted on the stem A.

The carrier F, the details of which are shown in Figs. 5 and 6 of the drawings, includes a body 60 with an opening 61 passing the stem A. In the particular case illustrated, the opening 61 passes the stem A with clearance, and friction members or liners 62 are carried in the opening 61 and frictionally engage the exterior of the stem. The engagement between the friction liners 62 and the stem A is such as to control the sliding of the carrier on the stem. The liners 62 provide for such motion of the stem as the user of the device requires and which results from deliberate operation of the carrier by the application of suitable pressure by means of the hand.

The body 60 of the carrier is provided with a second opening 63 that extends in a plane transverse of the axis of opening 61. An arm holder 70 is carried in opening 63 and is an elongate member with a split end portion 71 and a threaded end portion 72. The split end portion 71 projects somewhat from one side 73 of the body 60, where it has a transverse opening 74 intersecting the split 75 and slidably carrying the arm E. The arm E slidably carried in opening 74 in the holder 70 has a flat side 73ᵃ that slidably bears against the side 73 of the body 60 so that the arm is held against turning or rotation about its longitudinal axis. A nut 76 is threaded on the end portion 72 of holder 70 and bears against the opposite side 78 of body 60. Through this construction, when the nut 76 is released, the holder 70 can rotate in the opening 63 and the arm E can be slid freely in opening 74. When the nut 76 is tightened the construction just described is set so that the holder will not turn in opening 63 and the arm will not slide or turn in opening 74. With the construction just described, the parts can be readily set so that the head D on arm E is set in the desired manner relative to the stem A as shown in the drawings.

With the parts assembled and with the structure set on a tank T as shown in Figs. 1 and 2 of the drawings, the carrier F can be operated by turning it about the stem A and as the carrier turns, it can be moved lengthwise of the stem to maintain the marker M in contact with the exterior of the tank T, so that a projected circular mark is applied to the tank, as clearly shown in Fig. 1 of the drawings.

In the case of the construction illustrated in Fig. 11 of the drawings, the marker M is replaced by a cutter M', the cutter being provided with an elongate mounting bracket 80 that is carried by the head D in a manner similar to the mounting of the marker M as hereinabove described. In the particular case illustrated, the bracket 80 is suitably clamped to the elongate tubes 81 of the cutter M', the tubes being supplied by means of ducts 82 and serving to supply a cutter head 83. Further, if desired, a guide wheel W may be mounted on the structure just described, to be the element which actually engages the tank T and which serves to suitably space the head 83 from the tank T so that the desired cut is made as the structure is operated.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described by invention, I claim:

1. Apparatus for handling an element relative to an object including, a straight rigid elongate stem, mounting means adapted to support the stem rigidly in a predetermined position relative to the object, a straight rigid arm, a head on one end of the arm adapted to hold the element, and a carrier slidable and rotatable on the stem and carrying the arm with the head supported in predetermined spaced relation to the stem, said means including a base applicable to a support to be rigid thereon, an elongate standard, a universal coupling connecting the standard to the base for adjustment relative thereto, and a second coupling connecting the stem to the standard for longitudinal and pivotal adjustment relative thereto, said second coupling including a pair of oppositely disposed pivotally connected U-shaped holders, one having arms with openings slidably receiving the standard and releasably gripping the standard and the other having arms with openings slidably receiving the stem and releasably gripping the stem.

2. Apparatus for handling an element relative to an object including, a straight rigid elongate stem, mounting means adapted to support the stem rigidly in a predetermined position relative to the object, a straight rigid arm, a head on one end of the arm adapted to hold the element, and a carrier slidable and rotatable on the stem and carrying the arm with the head supported in predetermined spaced relation to the stem, said means including a base applicable to a support to be rigid thereon, an elongate standard, a universal coupling connecting the standard to the base for adjustment relative thereto, and a second coupling connecting the stem to the standard for longitudinal and pivotal adjustment relative thereto, the base having a flange with an opening therein and the first mentioned coupling including, a pin engaged through the opening, a nut threaded on the pin at one side of the flange, a sleeve on the pin, the pin and sleeve having registering openings, and a finger projecting from the standard and carried in said registering openings, and said second coupling including a pair of oppositely disposed pivotally connected U-shaped holders, one having arms with openings slidably receiving the standard and releasably gripping the standard and the other having arms with openings slidably receiving the stem and releasably gripping the stem.

References Cited in the file of this patent

UNITED STATES PATENTS

| | | |
|---|---|---|
| 467,562 | Sauerman | Jan. 26, 1892 |
| 804,067 | Stowe | Nov. 7, 1905 |
| 1,617,453 | Milleman | Feb. 15, 1927 |
| 1,743,024 | Clark | Jan. 7, 1930 |
| 1,991,117 | Porteous et al. | Feb. 12, 1935 |
| 2,436,542 | Black | Feb. 24, 1948 |
| 2,607,990 | Payamps | Aug. 26, 1952 |
| 2,659,972 | Norris | Nov. 24, 1953 |

FOREIGN PATENTS

| | | |
|---|---|---|
| 545,026 | Germany | Feb. 25, 1932 |
| 555,278 | Great Britain | Aug. 13, 1943 |
| 116,377 | Sweden | May 14, 1946 |
| 982,629 | France | Jan. 31, 1951 |